United States Patent [19]
Sera et al.

[11] Patent Number: 6,061,490
[45] Date of Patent: May 9, 2000

[54] OPTICAL FIBER BUNDLE WITH BUNDLING MEMBER

[75] Inventors: Mikio Sera, Aichi; Yukio Harada, Tokyo; Youjirou Watanabe, Aichi, all of Japan

[73] Assignee: Mitsubishi Rayon Co., Ltd., Tokyo, Japan

[21] Appl. No.: 09/126,952

[22] Filed: Jul. 31, 1998

[30] Foreign Application Priority Data

Aug. 1, 1997 [JP] Japan .................................... 9-207878

[51] Int. Cl.⁷ ...................................................... G02B 6/04
[52] U.S. Cl. ............................................................ 385/115
[58] Field of Search ............................ 385/114–117, 147

[56] References Cited

U.S. PATENT DOCUMENTS

| | | | |
|---|---|---|---|
| 4,957,343 | 9/1990 | Sato et al. .................................. | 385/96 |
| 5,222,180 | 6/1993 | Kuder et al. . | |
| 5,325,450 | 6/1994 | Suganuma et al. ........................ | 385/39 |
| 5,472,471 | 12/1995 | Baba et al. ................................ | 65/409 |
| 5,528,040 | 6/1996 | Lehman .................................... | 250/343 |
| 5,658,708 | 8/1997 | Kondo ................................... | 430/288.1 |
| 5,689,334 | 11/1997 | Atkinson et al. ......................... | 356/326 |
| 5,723,864 | 3/1998 | Atkinson et al. .................. | 250/339.13 |
| 5,742,054 | 4/1998 | Atkinson ............................ | 250/339.13 |
| 5,747,807 | 5/1998 | Atkinson et al. .................. | 250/339.13 |
| 5,815,277 | 9/1998 | Zare et al. ............................... | 356/440 |

OTHER PUBLICATIONS

Atkinson et al, "Detection of Free Radicals by an Intracavity Dye Laser Technique", *Journal of Chemical Physics*, vol. 59, pp. 350–354, (Jul. 1, 1973).

O'Keefe et al, "Cavity Ring–Down Optical Spectrometer for Absorption Measurements using Pulsed Laser Sources", *Reviews of Scientific Instruments*, vol. 59, No. 12, pp. 2544–2551 (Dec. 1988).

J.J. Scherer et al, "Cavity Ringdown Laser Absorption Spectroscopy: History, Development, and Application to Pulsed Molecular Beams", *Chemical Reviews*, vol. 97, No. 1, pp. 25–52 (Feb. 5, 1997).

*Primary Examiner*—Akm E. Ullah
*Attorney, Agent, or Firm*—Oblon, Spivak, McClelland, Maier & Neustadt, P.C.

[57] ABSTRACT

An optical fiber bundle with a assembling tool, which comprises a plurality of optical fibers 3 fusion-bonded and fixed, at one end or both ends thereof, in a hollow part of the assembling tool with substantially no space left therein, wherein at least a portion of said assembling tool 1 in contact with said optical fibers 3 is formed of a thermoplastic resin and provided that Tp represents the heat transformation temperature of said thermoplastic resin and Tc represents the heat transformation temperature of the core material of said optical fibers 3, the following equation (1):

$$Tc-5 \leq Tp \leq Tc+5 \qquad (1)$$

is satisfied. In the optical fiber bundle with a assembling tool according to the present invention, the optical fibers 3 are fixed firmly in the assembling tool 1 and at the same time, are free of the cross-sectional distortion.

3 Claims, 1 Drawing Sheet

OPTICAL FIBER BUNDLE WITH BUNDLING MEMBER

BACKGROUND OF THE INVENTION

1. Field of the Invention

The present invention relates to an optical fiber bundle having a plurality of optical fibers fixed at end portions thereof disposed and fixed in a sleeve.

2. Description of the Related Art

As a method for forming an optical fiber bundle by fixing end portions of a plurality of optical fibers into a metal-made sleeve, conventionally known are a method of fixing a plurality of optical fibers to a sleeve with a transparent adhesive and a method which comprises inserting assembled optical fibers into a sleeve, fusion-bonding them mutually by heating them and then holding and fixing the resulting optical fiber bundle with a transparent adhesive.

The method of using an adhesive is however accompanied with a problem that the adhesive component penetrated into the core and sheath of the optical fibers deteriorates the optical properties of the optical fibers. In addition, the transparent adhesive colored with the passage of time absorbs from an optical source much heat, which melts and distorts the optical fibers during the long-term use, thereby developing the problem of a deterioration in the optical properties.

As a conventional technique for overcoming the above-described problems, disclosed in Japanese Patent Application Laid-Open No. 62437/1996 is a technique of disposing an elastic material layer made of a heat-resistant rubber elastic material inside of a sleeve, thereby preventing both the dropping-out of an optical fiber bundle from the sleeve and the cross-sectional distortion of the optical fibers upon fusion-bonding by heating. In Japanese Patent Application Laid-Open No. 201927/1994 (U.S. Pat. No. 5,222,180), on the other hand, a technique of using as a assembling tool a rigid sleeve which has a softening temperature at least about 10° C. higher than that of the polymer optical fiber bundle is disclosed.

Since no adhesive is employed in the above-described techniques, they are free from the deterioration in the optical properties of the optical fibers caused by the coloring of an adhesive and are therefore excellent. The technique disclosed in Japanese Patent Application Laid-Open No. 62437/1996 is accompanied with the drawbacks that the workability upon processing is poor and because the optical fiber bundle is fixed to the sleeve through the soft elastic material, adhesion between the sleeve and the optical fiber bundle is insufficient and the fibers happen to bend in the sleeve. In the technique disclosed in Japanese Patent Application Laid-Open No. 201927/1994 (U.S. Pat. No. 5,222,180), the difference in a softening temperature between the polymer optical fiber bundle and rigid sleeve is too large so that the adhesion therebetween is insufficient.

SUMMARY OF THE INVENTION

An object of the present invention is to provide an optical fiber bundle in which optical fibers have been fixed firmly in a assembling tool without an adhesive and at the same time, their cross-sectional distortion have been reduced.

The above-described object can be accomplished by an optical fiber bundle with a assembling tool, which comprises a plurality of optical fibers fusion-bonded and fixed, at one end or both ends thereof, in a hollow part of the assembling tool with substantially no space left therein, wherein at least a portion of said assembling tool in contact with said optical fibers is formed of a thermoplastic resin and provided that Tp represents the heat transformation temperature of said thermoplastic resin and Tc represents the heat transformation temperature of the core material of said optical fibers, the following equation (1):

$$Tc - 5 \leq Tp \leq Tc + 5 \quad (1)$$

is satisfied.

DETAILED DESCRIPTION OF THE PREFERRED EMBODIMENTS

Figure 1:
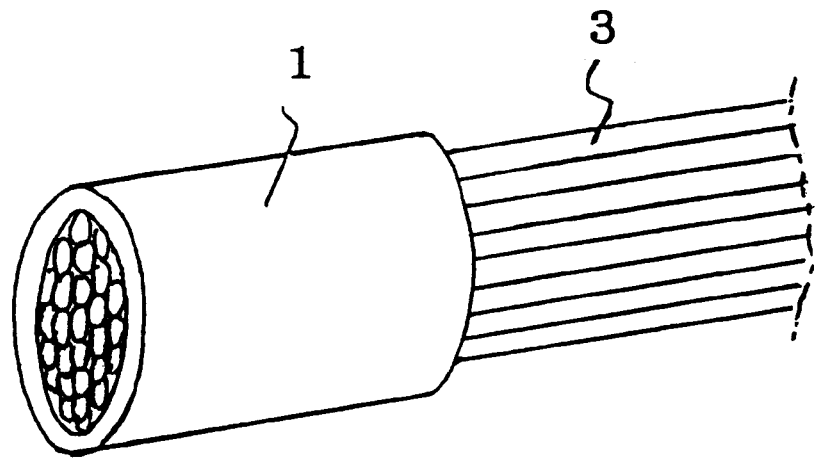
FIG. 1 is a perspective view of the optical fiber bundle with a assembling tool obtained in Example 1 of the present invention.

The optical fibers employed in the present invention are known plastic ones. They can be fusion-bonded each other by heating and at the same time, they can be fusion-bonded with the resin layer of a assembling tool. As the optical fibers, either a step index type or graded index type can be used. Examples of the core material of the optical fibers include methyl methacrylate (MMA) resins, polycarbonate resins and polystyrene resins. The graded index type optical fibers may be formed only of a core or have a clad at an outer periphery of the core.

In the present invention, the assembling tool (i.e. sleeve) can be installed at both ends or only one end of the optical fiber bundle.

The assembling tool to be used in the present invention has a hollow part and at least the inner periphery of it, in other words, a portion of the hollow part in contact with the outer periphery of the optical fiber bundle is formed of a thermoplastic resin. Although no particular limitation is imposed on the shape of the assembling tool, that of a cylindrically shape is usually employed.

The optical fiber bundle of the present invention is fixed, at the end portion thereof, in the hollow part of the assembling tool with the optical fibers being fusion-bonded mutually and the optical fibers and assembling tool being fusion-bonded.

In the present invention, with a view to obtaining an optical fiber bundle which is free of the transformation of the optical fibers and is more firmly fixed in the assembling tool, the difference between the heat transformation temperature Tp of the thermoplastic resin which forms at least the inner periphery of the assembling tool and the heat transformation temperature Tc of a resin constituting the core material of the optical fibers is set within 5° C. If a thermoplastic resin having such a heat transformation temperature is employed, transformation of the resin occurs at the same or substantially same temperature with that of the optical fibers so that the resin and optical fibers are transformed simultaneously by the heating at a certain temperature.

Accordingly, upon expansion of the optical fiber bundle in the assembling tool to a diameter direction of the fibers by heating, the transformation of the thermoplastic resin of the assembling tool occurs at the same time, which permits the prevention of the cross-sectional distortion or diminution of the optical fibers. Furthermore, when the optical fiber bundle with the assembling tool is cooled to normal temperature after fusion-bonding, the optical fibers and the thermoplastic resin of the assembling tool are in a close contact, which makes it possible to fix and hold the optical fibers in the assembling tool without easy dropping-out therefrom. It is more preferred to set Tp and Tc to satisfy the following equation: Tp≦Tc in order to reduce the transformation of the optical fibers.

Examples of the thermoplastic resin used for the assembling tool include (co)polymers having the same composition with that of the core material of the optical fibers and (co)polymers a little different from them in the copolymerization composition ratio. Described specifically, in the case of the core material made of polymethyl methacrylate (PMMA), PMMA or methyl methacrylate (MMA) (co) polymer, in the case of the core material made of polycarbonate, polycarbonate or polycarbonate (co)polymer and in the case of the core material made of polystyrene, polystyrene or styrene (co)polymer can be used. Here, examples of the MMA copolymer include copolymers containing not less than 90 wt. % of MMA and not greater than 10 wt. % of methyl acrylate or ethyl acrylate.

It is only necessary that the other portion of the assembling tool is formed of a material which is sufficiently resistant to heat treatment upon the production of the optical fiber bundle with the assembling tool. The whole assembling tool may be formed of the thermoplastic resin, or only the inner periphery of the assembling tool may be formed of the thermoplastic resin, while the other portion being formed of a metal or another resin.

It is preferred to dispose a metal-made protecting sleeve at the outer periphery of the assembling tool in order to prevent heat transformation of the assembling tool caused by exposure to incident light upon the use of the optical fiber bundle. Examples include aluminum-made and brass-made protecting sleeves. The protecting sleeve is preferably formed to cover the side surface of the assembling tool and the end surface on the incident end side of the fibers. There is no particular limitation imposed on the fixing method of the assembling tool and protecting sleeve. Examples include fixing with an adhesive and a screw clamp.

The optical fiber bundle with assembling tool according to the present invention is produced, for example, by the following method.

First, end portions of a plurality of optical fibers are inserted into the hollow part of the assembling tool as described above. It is preferred to bundle optical fibers with a cotton yarn or the like and form a temporary fiber bundle in advance in order to facilitate the insertion work. At this time, the larger the ratio of the total cross-sectional area of the optical fibers to the cross-sectional area of the hollow part of the assembling tool, the better. Usually, the ratio is preferably at least 50%, more preferably at least 75%, though depending on the drawing ratio of the optical fibers employed. If the area ratio is unduly small, a space is formed in the assembling tool after heating treatment and the bundle is presumably not fixed sufficiently to the assembling tool. Or, it presumably leads to the inconvenience that the optical fibers are fixed in the bent form or mutually crossed form in the assembling tool upon heat treatment.

In the next place, the assembling tool and optical fiber bundle inserted therein are subjected to heat treatment. They are heated at a temperature not lower than the heat transformation temperatures but not higher than the melting points of the optical fibers and thermoplastic resin of the assembling tool. There is no particular limitation imposed on the heating method. They may be heated by a known method. For example, the assembling tool and optical fiber bundle inserted into the hollow part thereof are heated in a heating atmosphere or a thermostatic chamber. This heat treatment causes expansion of the optical fibers in the direction of their diameter and at the same time, softens and fluidizes the outer periphery of the optical fibers, thereby filling the spaces existing in the assembling tool. As a result, the optical fibers themselves and also the optical fibers and the assembling toll can be brought into close contact.

Then, by cooling, the optical fibers are fusion-bonded and fixed completely in the hollow part of the assembling tool. There is no particular limitation imposed on the cooling method. Cooling may be carried out by a known method, for example, natural cooling in the air, putting in a water bath or spraying with a compressed air.

The optical fiber bundle according to the present invention can be used for various conventionally-known applications such as illumination and communication.

The present invention will hereinafter be described more specifically by examples.

EXAMPLE 1

An optical fiber bundle disposed in a sleeve, as illustrated in FIG. 1, according to the present invention was produced in the following manner.

One end of an optical fiber bundle made of 300 optical fibers having a diameter of 0.5 mm was assembled into a substantially circular shape of 10 mm in diameter and the assembled end portion of the bundle was inserted into the hollow part of the assembling tool 1. As the assembling tool 1, that made of PMMA (heat transformation temperature: about 100° C.) and shaped into a hollow cylinder (outer cross-sectional diameter: 16 mm, inner cross-sectional diameter: 10 mm, height: 30 mm) having a coaxially cylindrical hollow part was employed. As the optical fibers 3, step index type plastic fibers whose core material was made of PMMA and clad material was made of a fluorine-containing resin were employed.

The thermoplastic resin of the assembling tool 1 and the core material of the optical fibers 3 were both made of PMMA and their heat transformation temperature (Tp and Tc) was about 100° C.

Then, the end portion of the optical fiber bundle assembled by the assembling tool was inserted into an aluminum-made cylindrical sleeve holder. The sleeve holder was put in a thermostat to subject the optical fiber bundle in the assembling tool 1 to heat treatment at 120° C. As a result, the optical fibers 3 expanded in the direction of their diameter, whereby the optical fibers 3 themselves and also the optical fibers and assembling tool 1 were brought into close contact. The aluminum-made cylindrical sleeve holder was then put into a liquid bath for cooling, whereby the optical fiber bundle was completely fusion-bonded and fixed in the assembling tool.

By the above-described manner, the optical fiber bundle with their end portion disposed in the assembling tool according to the present invention as illustrated in FIG. 1 was obtained. In the optical fiber bundle thus obtained, the cross-sectional distortion of the optical fibers 3 was small and the optical fibers 3 were firmly fixed in the assembling tool 1. Then the end surface of the optical fiber bundle was polished. When a light was introduced into from its end surface, its transmission performance was superior.

EXAMPLE 2

Figure 2:
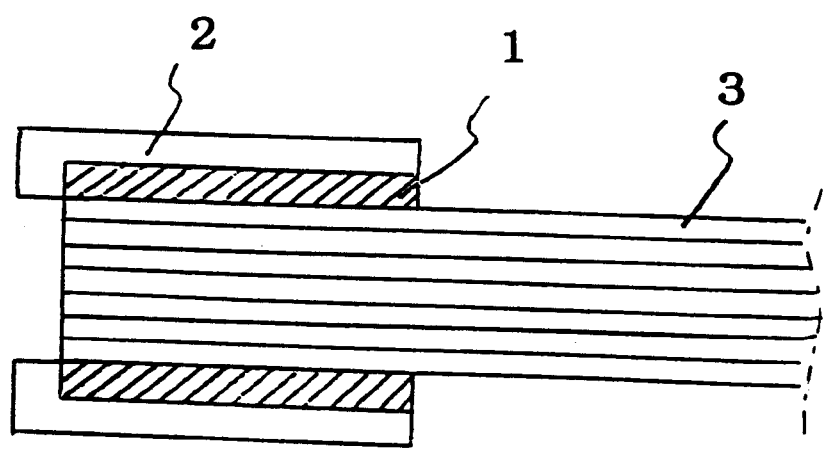
FIG. 2 is a cross-sectional view of the optical fiber bundle with a assembling tool obtained in Example 2 of the present invention.

In a similar manner to Example 1, the assembling tool 1 was fixed to the end portion of the optical fiber bundle. At the outer periphery of the assembling tool 1, a protecting sleeve 2 made of aluminum was fixed with an adhesive, whereby the assembling-tool-equipped optical fiber bundle of the present invention as illustrated in FIG. 2 was obtained. The protecting sleeve 2 was disposed to cover both the side surface of the assembling tool 1 for fixing the optical fiber bundle and the end surface of the incident end side. The use of the protecting sleeve 2 improved the thermal durability of the assembled portion of the optical fiber bundle disposed in the assembling tool, because the assembling tool 1 was not exposed to the incident light.

We claim:

1. An optical fiber bundle with a assembling tool, which comprises a plurality of optical fibers fusion-bonded and fixed, at one end or both ends thereof, in a hollow part of the assembling tool with substantially no space left therein, wherein at least a portion of said assembling tool in contact with said optical fibers is formed of a thermoplastic resin and provided that Tp represents the heat transformation temperature of said thermoplastic resin and Tc represents the heat transformation temperature of the core material of said optical fibers, the following equation (1):

$$Tc-5 \leq Tp \leq Tc+5 \tag{1}$$

is satisfied.

2. An optical fiber bundle according to claim 1, wherein Tp and Tc are substantially equal.

3. An optical fiber bundle according to claim 1 or 2, wherein a metal-made protecting sleeve is disposed at an outer periphery of the assembling tool.

* * * * *

UNITED STATES PATENT AND TRADEMARK OFFICE
CERTIFICATE OF CORRECTION

PATENT NO.    : 6,061,490

DATED         : May 9, 2000

INVENTOR(S): Mikio SERA, et al.

It is certified that an error appears in the above-identified patent and that said Letters Patent is hereby corrected as shown below:

On the title page, item [54], and at the top of Column 1, the Title is incorrectly listed. It should read as follows:

--[54]  OPTICAL FIBER BUNDLE WITH ASSEMBLING TOOL--

Signed and Sealed this

Twenty-second Day of May, 2001

Attest:

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO.    : 6,061,490
DATED         : May 9, 2000
INVENTOR(S)   : Mikio Sera, et al.

It is certified that error appears in the above-identified patent and that said Letters Patent is hereby corrected as shown below:

<u>Title page,</u>
Item [75], the snd inventors name is incorrect.
Item [75] should read as follows:

-- [75] Inventors: Mikio Sera, Aichi; Yukio Harata, Tokyo;
                    Youjirou Watanabe, Aichi, all of Japan --

Signed and Sealed this

Eighteenth Day of September, 2001

*Attest:*

*Attesting Officer*

NICHOLAS P. GODICI
*Acting Director of the United States Patent and Trademark Office*